United States Patent Office 2,813,888
Patented Nov. 19, 1957

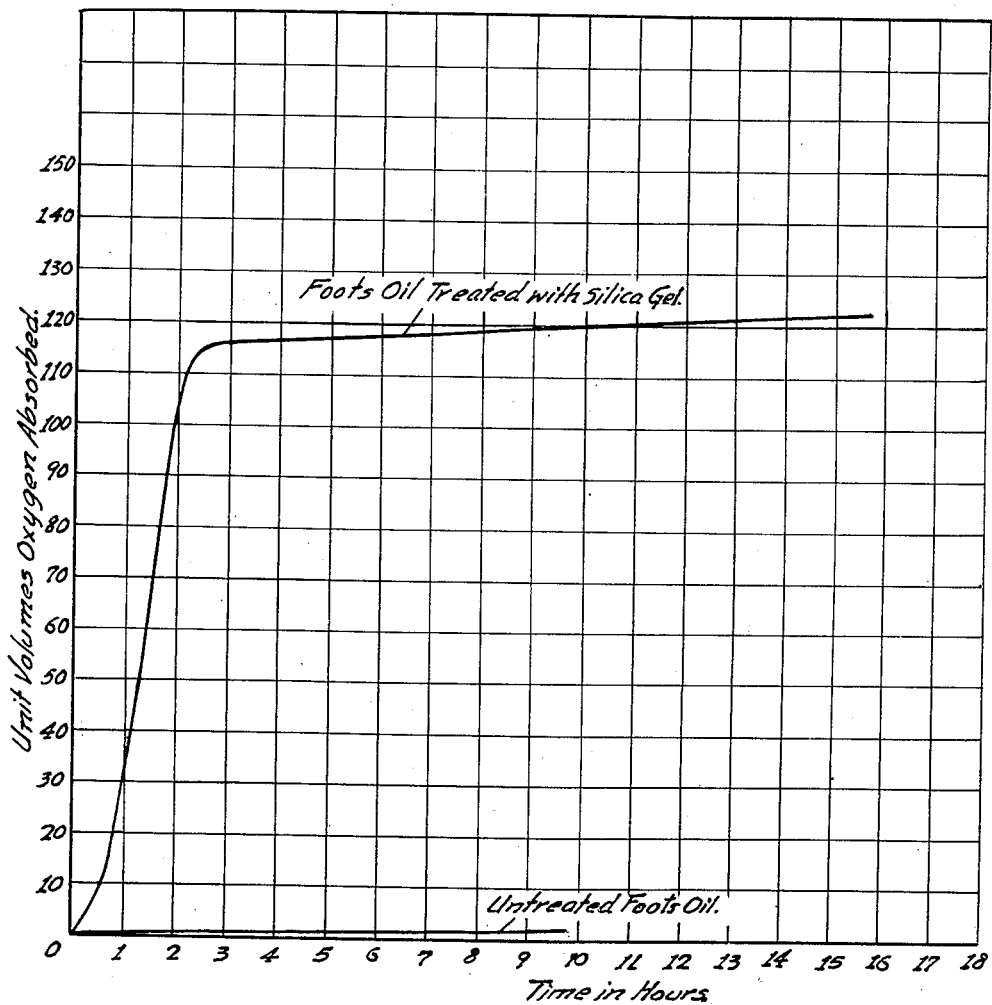

2,813,888

PROCESS FOR OXIDIZING HYDROCARBONS

Russell G. Hay, Fox Chapel Borough, and James R. Tomlinson, Springdale, Pa., assignors to Gulf Research & Development Company, Pittsburgh, Pa., a corporation of Delaware Application June 19, 1953, Serial No. 362,855

10 Claims. (Cl. 260—451)

This invention relates to an oxidation process for converting hydrocarbons derived from petroleum or other sources to oxygenated products and particularly to an oxidation process for converting such hydrocarbons to oxygenated products wherein the oxidation thereof is facilitated and improved.

It has been known in the art to oxidize hydrocarbons with air or other oxygen-containing gas, i. e., a gas containing free oxygen, at an elevated temperature to obtain desirable oxygenated compounds such as alcohol, aldehydes, ketones, acids, etc. While such oxidation process can be conducted at a temperature as low as about 120° C. the oxidation rate at such temperature is exceedingly slow and therefore a temperature above about 150° C., generally from about 160° to about 180° C., is preferred. There are, however, impure hydrocarbons containing oxidation inhibitors as impurities, examples of which are waxy stocks such as foots oil, waxy discharges, wax distillates, slack wax, scale wax, etc., cheap and readily available, which would normally be attractive as charge material for such oxidation process but which are not normally used because they are difficult to oxidize and the oxidation products resulting therefrom are not satisfactory for commercial use. Thus, oxidation of foots oils requires use of a catalyst and a temperature of at least about 180° C. However, under such conditions and at such high temperatures considerable carbon dioxide is formed, other side reactions, probably polymerization, decomposition or condensation occur, and the product resulting is a tarry material containing a large amount of unusable material.

In accordance with our invention, impure hydrocarbons containing oxidation inhibitors as impurities, which hydrocarbons in the pure state are readily oxidizable with an oxygen-containing gas at a temperature of about 120° to about 180° C., are rendered easily oxidizable in air, oxygen or other oxygen-containing gas, i. e. a gas containing free-oxygen, by treating such an impure hydrocarbon with silica gel prior to subjecting the hydrocarbon to oxidation. We have discovered, for example, that by pretreating foots oil with silica gel this normally difficultly oxidizable material can be readily oxidized with an oxygen-containing gas, apparently due to the fact that the silica gel treatment removes certain naturally-occurring oxidation inhibitors present in the foots oil. Closely similar materials which can be employed as starting materials in accordance with the invention are other waxy petroleum oils obtained in the manufacture of paraffin wax from petroleum oils. It will be understood that in referring to a waxy petroleum oil, in certain cases the wax may be present in such amounts as to contitute a major proportion of the material. Specific examples of such other materials are the waxy discharges, wax distillates, slack wax and scale wax, referred to above.

Foots oil which has been treated with silica gel to remove the natural inhibitors therefrom can be easily oxidized with an oxygen-containing gas at a relatively low temperature, for example, with air at a temperature of about 150° C., and does not require the presence of a catalyst. The oxidized product is light in color, no tarry material is obtained and little or no part of the treated charge material is converted to carbon dioxide. Although the process of the invention can be employed for the treatment of any of the hydrocarbon materials referred to above, since we have obtained especially good results with foots oil, our discussion will be mainly concerned with the treatment of this oil.

Conditions for treating the difficultly oxidizable starting materials are not critical, provided there is adequate and sufficient contact between the starting materials and the silica gel. In the event the starting material is contacted with silica gel without the aid of a carrier, the treatment should be carried out at an elevated temperature sufficient to maintain the starting material in a fluid state. We have found that a temperature of about 90° to about 200° F., and preferably from about 100° to about 125° F., is sufficient to maintain the starting materials in a fluid state. If it is desired to contact the starting material with silica gel without placing the starting material in a fluid state, then the starting material is dissolved in a suitable carrier and the treatment is carried out at a temperature of about 0° to about 150° F., and preferably at a temperature of about 32° to about 100° F. The treatment may be carried out under any suitable conditions. Although contact between the starting material and silica gel may be effected in any desired manner, we have obtained excellent results by passing the difficultly oxidizable starting material through a column packed with silica gel. In the event contact between the starting material and the silica gel is effected in a column packed with silica gel, only sufficient pressure need be employed to hasten the flow of starting material through the column.

In order to illustrate the process of our invention we have run the following typical experiments in accord with one mode of operation.

EXAMPLE 1

171 grams (215 milliliters) of foots oil were passed through a column having an inner diameter of 0.9 inch and packed to a height of 46 inches with silica gel having a size varying from about 28 to 200 mesh. The silica gel in the column amounted to 284 grams (475 milliliters), and therefore the oil to gel ratio was 0.45, volume per volume. The pressure was 6 pounds per square inch gauge and the temperature during the run varied from about 60° to 100° C. As soon as the foots oil had been introduced into the column and had passed below the top surface of the column of silica gel, but before its passage through the column, ethyl alcohol in an amount of 740 grams (950 milliliters) was passed through the silica gel. The foots oil and the ethyl alcohol remain as separate layers in their passage through the silica gel, with the foots oil passing through first followed by the ethyl alcohol. 82 minutes were required for the passage of foots oil through the column of silica gel, while 222 minutes were required for the passage of the ethyl alcohol. Ethyl alcohol, being more strongly adsorbed on the silica gel surface than the foots oil, is used to desorb or remove the foots oil constituents from the silica gel. The results of this test are tabulated below in the following table:

*Treatment of foots oil with silica gel*

|  | Grams | Minutes |
|---|---|---|
| Charge: |  |  |
| Foots Oil | 171.1 | 82 |
| Ethyl Alcohol | 740.0 | 222 |
| Total | 911.1 | 304 |
| Product: |  |  |
| Cut No. 1 | 33.3 | 15 |
| Cut No. 2 | 30.2 | 15 |
| Cut No. 3 | 28.3 | 14 |
| Cut No. 4 | 32.7 | 15 |
| Cut No. 5 | 29.9 | 14 |
| Cut No. 6 | 184.2 | 53 |
| Cut No. 7 | 378.0 | 82 |
| Cut No. 8 | 161.6 | 162 |
| Total | 878.2 | 370 |

The various cuts were taken at the time intervals indicated. The first four cuts, amounting to 72.7 weight percent of the foots oil charged, was a white wax substantially entirely free of ethyl alcohol and natural inhibitors. Cut No. 5 contained an estimated 15 percent of the oil charged, some alcohol and some natural inhibitors, the latter being present because of the removal from the silica gel surface of some of the inhibitors by the ethyl alcohol and because of the decreased activity with throughput of the silica gel. Cuts numbered 6, 7 and 8, containing an estimated 12 percent of the foots oil charged, comprised primarily ethyl alcohol and the remainder of the inhibitors. The ethyl alcohol can be removed from the latter cuts as well as cut number 5 by distillation to obtain a foots oil carrying a relatively large amount of inhibitors. After removal of the ethyl alcohol, these cuts can be recycled if desired. A total of 878.2 grams of treated foots oil, ethyl alcohol and inhibitors was recovered from a total 911.1 grams of total charge, indicating a recovery of 96.3 weight percent.

If desired we can pass all of the foots oil through the silica gel column prior to cleaning with ethyl alcohol, although the initial cuts will have more of the inhibitors removed than the latter cuts because of the decrease in activity of the silica gel with throughput. While we have shown the use of ethyl alcohol as an eluant, we may use any hydrocarbon or polar solvent such as methyl alcohol, ethyl alcohol, propyl alcohol, acetone, ethyl acetate, etc., in place of ethyl alcohol. It may be preferable to elute first with a weakly adsorbed solvent, such as pentane, followed by a more strongly adsorbed solvent, such as methyl alcohol, in order to obtain maximum recovery of deinhibited foots oil. To remove from the surface of the silica gel the inhibitors deposited thereon, we can pass through the column any solvent more strongly adsorbed on the silica gel surface than the inhibitors, such as methyl alcohol. The eluted silica gel can be regenerated by removal of the eluant by methods known in the art, such as stripping with steam or blowing with air or inert gas at an elevated temperature.

In order to show the improved oxidation of a difficulty oxidizable hydrocarbon when treated with silica gel in accordance with our invention, we have run oxidation tests on untreated foots oil and the treated foots oil obtained in the first 4 cuts in Example 1. In these tests oxygen was bubbled through the samples at 150° C. for a number of hours and the volume of oxygen chemically absorbed was measured at 15 minute intervals. The oxidation tests were run in apparatus such as described in Industrial and Engineering Chemistry, volume 28, page 1342, 1936. The results of these tests are set forth in the graph in the accompanying drawing, which is hereby incorporated in and made a part of this specification, where the unit volumes of oxygen absorbed per part of foots oil is plotted against time in hours. It will be noted that untreated foots oil takes up oxygen very slowly at 150° C., for at the end of 9½ hours only about two units of oxygen were taken up by the foots oil, indicating the presence of substantial amounts of oxidation inhibitors. However, the foots oil obtained from Example 1, which has been treated with silica gel, shows a very short induction period and its oxidation was substantially complete at 2½ hours.

While we have shown that we can pass the charge stocks which are to be treated in accordance with our invention through a column of silica gel without the use of a carrier, we can do so if the temperature is sufficiently high to maintain the charge stock in a fluid state, that is, at a temperature of about 90° to about 200° F. We prefer to operate in this manner because there is no need to separate the carrier from the charge stock after treatment with silica gel. However, if it is desired to operate at a temperature below that at which the charge stock is in a fluid state, the charge stock can be dissolved in a low boiling hydrocarbon, preferably a paraffinic hydrocarbon such as butane, pentane, hexane and the like, after which the solvent can be removed from the charge after treatment with silica gel.

In order to establish the identity of the inhibitors removed from a difficultly oxidizable hydrocarbon in accordance with our invention, we have run the following experiment.

EXAMPLE 2

A sample of foots oil discard was dewaxed by cooling a methyl ethyl ketone solution and centrifuging to separate the oil-containing liquid portion from the solid wax. The filtrate was chilled to a lower temperature and centrifuged. This process was repeated several times, the final filtrate being obtained at 0° F. The wax cakes were not washed, so some of the oil was lost in processing. After evaporation of the solvent the oil recovered represented 28.3 percent of the original foots oil discard sample.

A 300-gram sample of this 0° F. foots oil discard filtrate was diluted with 1800 milliliters of n-pentane and passed through a column 5 centimeters in diameter and 35 centimeters deep packed with silica gel having a size varying from about 28 to about 200 mesh. The column was then washed with n-pentane until no more oily material was extracted. The adsorbate was then stripped from the column with a mixture consisting of 80 percent benzene and 20 percent methanol by volume. After evaporation of solvent 0.9 gram of a tarry, black material analyzing as follows was obtained: 81.40 percent carbon, 9.57 percent hydrogen, 1.96 percent sulfur, 0.83 percent nitrogen and 2.26 percent ash. When 0.03 gram of the material so removed from foots oil was added to 300 grams of a 122° F. melting point paraffin wax, and the treated wax was exposed to an air flow rate of 1.6 cubic feet per hour at a temperature of about 240° F., it was found to increase the induction period of the paraffin wax 2⅓ times.

Although we have shown specifically the removal of oxidation inhibitors from foots oil by contact with silica gel, it is understood that our invention is not so limited and that similar results can be obtained by contacting with silica gel any impure hydrocarbon containing an oxidation inhibitor as an impurity, said hydrocarbon in the pure state being readily oxidizable with an oxygen-containing gas at a temperature of about 120° to about 180° C.

Obviously many modifications and variations of the invention as herein above set forth may be made without departing from the spirit and scope thereof and therefore only such limitations should be imposed as are indicated in the appended claims.

We claim:

1. In a process for oxidizing an impure hydrocarbon containing oxidation inhibitors as impurities, which hydrocarbon in the pure state is readily oxidizable with an oxygen-containing gas at a temperature of about 120° to about 180° C., the improvement comprising contacting said hydrocarbon with silica gel prior to oxidizing with said oxygen-containing gas, whereby said hydrocarbon is rendered easily oxidizable in said gas.

2. In a process for oxidizing a waxy petroleum oil containing oxidation inhibitors as impurities, which waxy petroleum oil in the pure state is readily oxidizable with an oxygen-containing gas at a temperature of about 120° to about 180° C., the improvement comprising contacting said waxy petroleum oil with silica gel prior to oxidizing with said oxygen-containing gas, whereby said waxy petroleum oil is rendered easily oxidizable in said gas.

3. In a process for oxidizing foots oil with an oxygen-containing gas, which foots oil in the pure state is readily oxidizable with an oxygen-containing gas at a temperature of about 120° to about 180° C., the improvement comprising contacting said foots oil with silica gel prior to oxidizing with said oxygen-containing gas, whereby said foots oil is rendered easily oxidizable in said gas.

4. In a process for oxidizing an impure hydrocarbon containing oxidation inhibitors as impurities, which hydrocarbon in the pure state is readily oxidizable with an oxygen-containing gas at a temperature of about 120° to about 180° C., the improvement comprising contacting said hydrocarbon with silica gel at a temperature of about 0° to about 200° F. prior to oxidizing with said oxygen-containing gas, whereby said hydrocarbon is rendered easily oxidizable in said gas.

5. In a process for oxidizing a waxy petroleum oil containing oxidation inhibitors as impurities, which waxy petroleum oil in the pure state is readily oxidizable with an oxygen-containing gas at a temperature of about 120° to about 180° C., the improvement comprising contacting said waxy petroleum oil with silica gel at a temperature of about 0° to about 200° F. prior to oxidizing with said oxygen-containing gas, whereby said waxy petroleum oil is rendered easily oxidizable in said gas.

6. In a process for oxidizing foots oil with an oxygen-containing gas, which foots oil in the pure state is readily oxidizable with an oxygen-containing gas at a temperature of about 120° to about 180° C., the improvement comprising contacting said foots oil with silica gel at a temperature of about 0° to about 200° F. prior to oxidizing with said oxygen-containing gas, whereby said foots oil is rendered easily oxidizable in said gas.

7. In a process for oxidizing an impure hydrocarbon containing oxidation inhibitors as impurities, which hydrocarbon in the pure state is readily oxidizable with an oxygen-containing gas at a temperature of about 120° to about 180° C., the improvement comprising dissolving said hydrocarbon in a low boiling hydrocarbon and contacting said solution with silica gel prior to oxidizing with said oxygen-containing gas, whereby said difficultly oxidizable hydrocarbon is rendered easily oxidizable in said gas.

8. In a process for oxidizing a waxy petroleum oil containing oxidation inhibitors as impurities, which waxy petroleum oil in the pure state is readily oxidizable with an oxygen-containing gas at a temperature of about 120° to about 180° C., the improvement comprising dissolving said waxy petroleum oil in a low boiling hydrocarbon and contacting said solution with silica gel prior to oxidizing with said oxygen-containing gas, whereby said waxy petroleum oil is rendered easily oxidizable in said gas.

9. In a process for oxidizing foots oil with an oxygen-containing gas, which foots oil in the pure state is readily oxidizable with an oxygen-containing gas at a temperature of about 120° to about 180° C., the improvement comprising dissolving said foots oil in a low boiling hydrocarbon and contacting said solution with silica gel prior to oxidizing with said oxygen-containing gas, whereby said foots oil is rendered easily oxidizable in said gas.

10. In a process for oxidizing an impure hydrocarbon containing oxidation inhibitors as impurities, which hydrocarbon in the pure state is readily oxidizable with an oxygen-containing gas at a temperature of about 120° to about 180° C., the improvement comprising passing said hydrocarbon through a column of silica gel, subsequently passing through said column a solvent more strongly adsorbed on the silica gel than said hydrocarbon, separately removing said hydrocarbon and said solvent from said column, whereby said hydrocarbon is rendered easily oxidizable in said gas and the foots oil constituents on the silica gel surface are removed by said solvent.

References Cited in the file of this patent
UNITED STATES PATENTS

| | | |
|---|---|---|
| 2,398,101 | Lipkin | Apr. 9, 1946 |
| 2,447,794 | Brewer | Aug. 24, 1948 |
| 2,472,152 | Farkas et al. | June 7, 1949 |
| 2,521,698 | Denison et al. | Sept. 12, 1950 |
| 2,632,727 | Lanneau et al. | Mar. 24, 1953 |
| 2,636,047 | Riethof et al. | Apr. 21, 1953 |
| 2,674,568 | Lillard | Apr. 6, 1954 |
| 2,682,553 | Kirk et al. | June 29, 1954 |